United States Patent [19]

Chen et al.

[11] 4,266,338
[45] May 12, 1981

[54] METHOD OF MANUFACTURING PHOTOELECTROCHEMICAL CELL

[75] Inventors: Schoen-nan Chen, North Brunswick, N.J.; Michael A. Russak, Farmingdale, N.Y.; Horst Witzke, Princeton, N.J.; Joseph Reichman, Great Neck, N.Y.; Satyendra K. Deb, East Brunswick, N.J.

[73] Assignees: Grumman Aerospace, Bethpage, N.Y.; Refac Electronics, Barkhamsted, Conn.

[21] Appl. No.: 20,373

[22] Filed: Mar. 14, 1979

Related U.S. Application Data

[62] Division of Ser. No. 880,071, Feb. 22, 1978, Pat. No. 4,172,925.

[51] Int. Cl.³ .................. H01M 6/30; H01M 6/36
[52] U.S. Cl. ............................ 29/623.2; 29/623.1
[58] Field of Search ............... 29/623.2, 623.4, 623.1; 429/111

[56] References Cited

U.S. PATENT DOCUMENTS

| | | | |
|---|---|---|---|
| 3,708,220 | 1/1973 | Meyers et al. | 429/111 |
| 3,884,720 | 5/1975 | Armstrong | 429/119 |
| 3,925,212 | 12/1975 | Tchernev | 429/111 |
| 3,989,542 | 11/1976 | Clark | 429/111 |
| 4,011,149 | 3/1977 | Nozik | 429/111 |
| 4,042,758 | 8/1977 | Weinstein et al. | 429/111 |
| 4,064,326 | 12/1977 | Manassen et al. | 429/111 |
| 4,084,043 | 4/1978 | Witzke et al. | 429/111 |
| 4,084,044 | 4/1978 | Heller et al. | 429/111 |
| 4,086,398 | 4/1978 | Cartmell et al. | 429/111 |

OTHER PUBLICATIONS

Manassen, J., et al., "Photoelectrochemical Energy Conversion and Storage", from *J. Electrochem. Soc.*, vol. 124, 1977, pp. 532–534.

Miller, B., et al., "Semiconductor Liquid Junction Solar Cells Based on Anodic Sulphide Films", from *Nature*, vol. 262, 1976, pp. 680, 681.

Hodes, et al., "Photoelectrochemical Energy Conversion and Storage Using Polycrystalline Chalocogenide Electrodes", from *Nature*, vol. 261, 1976, pp. 403, 404.

*Primary Examiner*—Daniel C. Crane

[57] ABSTRACT

Photoelectrochemical cell structures and methods of fabrication are disclosed which provide for easily manufactured efficient energy conversion devices. The structures incorporate one or more chambers for the electrolyte, and utilize semiconductor photoelectrodes. In the plural chamber structure, the semiconductor may be opaque, and need not necessarily be a thin film. Specific dopants for the semiconductor provide for decreased dark current and increased open circuit voltage. Post deposition treatment is disclosed for the semiconductor to provide an increased shorting current. Increased sputtering wattage is provided to increase the short circuit current available from the cell. An electrolyte composition is described having improved performance at high light intensity.

4 Claims, 12 Drawing Figures

METHOD OF MANUFACTURING PHOTOELECTROCHEMICAL CELL

This is a division of application Ser. No. 880,071, filed Feb. 22, 1978 now U.S. Pat. No. 4,172,925.

BACKGROUND OF THE INVENTION

1. Field of the Invention

The invention relates to photoelectrochemical devices, and more particularly to such devices including one or more of the following features: stabilization of electrodes against dissolution; multi-chamber structures permitting the use of non-transparent electrodes; multi-photoelectrode structures, the various electrodes responsive to differing portions of the spectrum; heat exchange means utilizing the electrolyte for conversion of heat energy developed therein; and multi-chamber structures incorporating storage electrodes in combination with one or more of the previously discussed features.

2. Background of the Invention

Great effort has been expended to provide alternatives to the finite sources of energy currently available. One alternative recently contemplated is the generation of electrical energy by conversion of solar radiation. The scientific literature has provided several examples of photoelectrochemical systems useful for the photo-electrolysis of water or the photo-oxidation of some suitable redox species. The theory underlying these systems and phenomena is reasonably well understood and is outlined, for example, in the following publications:

Gerischer, "Electrochemical Photo and Solar Cells Principles and Some Experiments," *Electroanalytical Chemistry and Interfacial Electrochemistry*, Vol. 58, pp. 263–274 (1975); Manassen et al, "Electrochemical, Solid State, Photochemical and Technological Aspects of Photoelectrochemical Energy Converters," *Nature*, Vol. 263, pp. 97–100, (1976); Ellis et al, "Study of N-Type Semiconducting Cadmium Chalcogenide-Based Photoelectrochemical Cells Employing Polychalcogenide Electrolytes," *J. American Chemical Society*, Vol. 99, pp. 2839–18, (1977); Wrighton et al, "Photo-Assisted Electrolysis of Water by Irradiation of a Titanium Dioxide Electrode," *Proc. Nat. Acad. Sci., U.S.A.*, Vol. 72, No. 4, pp. 1518–1522 (1975); and Manassen et al U.S. Pat. No. 4,064,326.

The photoelectrodes as generally described are semiconductors, n-type semiconductors being photo-anodes and p-type semiconductors being photo-cathodes. The semiconductors may be large bandgap materials, for example, n-$TiO_2$ or small bandgap materials, for example n-GaAs. However, the application of photoelectrochemical semiconductor-electrolyte systems to the conversion of solar radiation to electrical energy suggests that semiconductors with bandgaps near 1.4 eV will be the most efficient with respect to the amount of solar radiation that can be usefully absorbed and converted to electrical energy. This consideration is well known from the established theory of solid state photovoltaic devices. Until recently, however, small bandgap materials could not be employed as photo-anodes for example, since irradiation in the presence of an electrolyte usually resulted in the photodissolution of the semiconductors. Several examples of redox couples are now known that will essentially eliminate the photo-dissolution of small bandgap semiconductors.

SUMMARY OF THE INVENTION

The present invention accordingly provides a complete cell, incorporating therein small bandgap materials and proper stabilization of the electrodes to prevent the photodissolution thereof. Moreover, the present invention provides for multi-chamber structures permitting the use of non-transparent photoelectrodes, as well as manufacturing processes for the production of such cells. Additionally, the present invention provides for the use of multi-photoelectrodes, with resulting response to separate portions of the electromagnetic spectrum. The above features are further combined in the present invention with a structure permitting the use of the electrolyte as a working heat exchange fluid. Moreover, a charge storage feature is provided by the present invention.

It is accordingly a primary objective of the present invention to provide an economical photoelectrochemical cell for the useful conversion of solar energy to electrical energy.

It is another object to provide useful manufacturing techniques for the above.

An additional object is to provide photoelectrochemical cells utilizing a plurality of photoelectrodes, each being sensitive to a different portion of the solar spectrum.

A further object is to provide techniques for the improvement of the performance of specific photoelectrodes by post-deposition treatments.

It is still a further object of the invention to provide an improved voltage output of a specific photoelectrode by doping the semiconductor material used therein with a suitable impurity.

Yet another objective of the invention is to provide an improved electrolyte for a photoelectrochemical cell.

It is an additional object to provide a photoelectrochemical cell wherein the electrolyte is used as a working heat exchange fluid for the transfer of thermal energy.

Still another object is to provide an improved photoelectrochemical cell capable of storage of electrical charge via the use of a storage electrode in addition to the photo-anode and cathode.

These and other objectives, features and advantages of the present invention will become apparent upon reading the specification, particularly in conjunction with the attached figures.

BRIEF DESCRIPTION OF THE DRAWINGS

FIG. 1b illustrates a specific detail of the cell of FIG. 1a.

FIG. 5 provides operating data for the cell of FIG. 4a.

DETAILED DESCRIPTION OF THE PREFERRED EMBODIMENTS

Figure 1A:
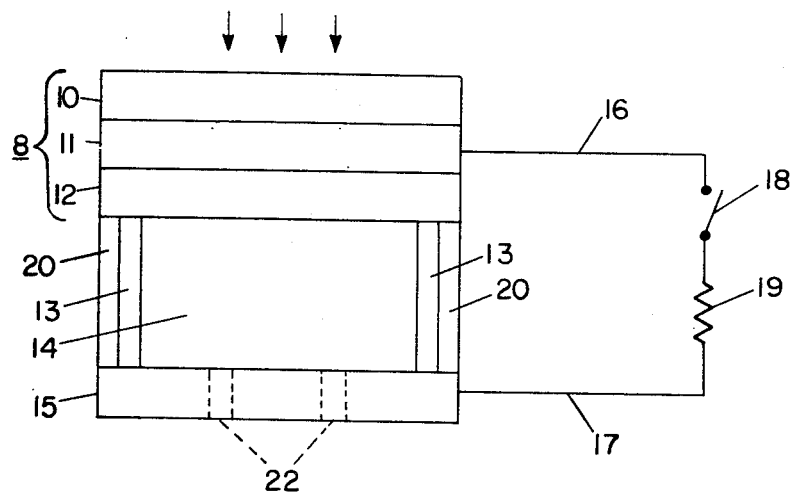
FIG. 1a illustrates the basic structure of a photoelectrochemical cell.

The basic embodiment is shown in FIG. 1a and includes a composite electrode 8. A pair of electrodes 11 and 15, at least one of which is transparent to light, is connected to wires 16 and 17. Wires 16 and 17 are connected to the electrodes for conducting the photoelectrochemically generated current from the cell. An electrolyte 14 is surrounded by walls formed by an annular spacer 13 and an epoxy structure 20. Elements 10, 11 and 12 comprise a composite electrode 8 receiving incident radiation thereon. Transparent substrate 10 and transparent conductor 11 are commercially available as NESA glass. Layer 12 comprises a semiconductor photoelectrode.

Element 11 is a transparent conductor to which is connected wire 16. Leads 16 and 17 are connected to an electrical load 19 by way of switch 18.

The cell structure further includes fill-holes 22 shown as penetrating electrode 15 but clearly placeable in other components of the present structure. The fill-holes may be placed in the spacer section 13 or electrode 8, for example. Electrolyte material is injected through the fill-holes to the volume provided therefor, and the holes may then be sealed. The seals may be permanently or replaceably installed in holes 22.

Figure 1B:
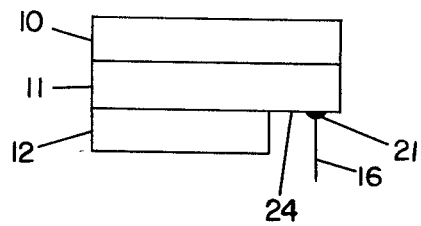

Lead 16 may be bonded using conductive epoxy adhesive, to the composite electrodes 8 by providing a tab 24 therein as shown in FIG. 1b.

As disclosed in co-pending applications Ser. Nos. 582,344 and 763,073, assigned to the assignee hereof, photosensitive suspensions may be provided in the electrolyte or may be provided as a layer upon the electrode 11, thereby providing a semiconductor photoelectrode for the device. Unlike the above-mentioned applications, however, rather than using titanium dioxide the present invention contemplates the use of narrower bandgap semiconductor elements.

Wrighton et al, supra, has disclosed that a single crystal semiconductor electrode may be stabilized by the use of proper redox couples within the electrolyte. To avoid the dissolution and decomposition of the electrode, certain chemical species must be added to the electrolyte.

One feature of the presently preferred embodiment is the use of a polycrystalline electrode in contact with an electrolyte, advantageously providing economic savings, as well as the desired structural properties, permitting the electrodes to be transparent, or to be formed as thin films where needed.

Unlike prior art devices, such as disclosed and claimed in the aforementioned co-pending applications, the present device utilizes polysulfide ions as the redox couple in a closed loop regenerative system. The system permits the ions to be oxidized at the front electrode 8 responsive to photoactivity, the electrons given up thereby traveling along lead 16, switch 18, load 19 and lead 17 to the counterelectrode 15 where the oxidized ions are then reduced after having migrated to the electrode by means of ordinary diffusion. While polysulfide ions are disclosed in the previous discussion, the general class of polychalcogenide electrolytes may be used, and polysulfide ions are merely used as an illustrative example.

With respect to the fabrication of the cell shown in FIG. 1, the general procedure comprises the steps of depositing a semiconductor thin film on a transparent conductive substrate, performing a postdeposition treatment of the coated substrate, such as heating and/or etching for example, attaching a lead to the transparent conducting portion of the electrode, placing an inert gasket material around the perimeter of the electrode, placing a stable counterelectrode on top of the gasket, sealing the cell with a non-conductive sealant to prevent leakage, filling the cell with an electrolyte and sealing the fill-holes. The lead wire 17 is attached to the counterelectrode 15 after placement of the counterelectrode on the gasket 13.

Further considering the structure shown in FIG. 1a, semiconductor thin film layer 12 comprises a polycrystalline thin film which is at least partially transparent, for example, having a thickness preferably no greater than 25 micrometers ($\mu$m). Semiconductor materials such as CdS, CdSe, CdTe or GaAs or others known to those skilled in the art may be used to fabricate layer 12. The materials may be deposited by sputtering, chemical vapor deposition (CVD) or vacuum evaporation of the compound and/or the constituent elements on a transparent conducting substrate 11 (commercially available as NESA glass) comprising doped $SnO_2$ for example. However, the conducting substrate 10, 11 may similarly comprise $SnO_2+In_2O_3$ alloy, $Cd_2SnO_4$, etc. Layer 10, may, however, comprise plastic or any other transparent material as alternatives to glass.

The semiconductor thin film 12 may be rendered n-type or p-type by proper choice of suitable deposition conditions, or by subsequent heat treatment or doping as is well known in the art. The presently preferred embodiment contemplates the use of an n-type material. Deposition conditions or subsequent heat treatment rendering the material n-type may not be necessary where the material initially emerges as n-type, however.

It is to be emphasized that the post-deposition treatment is not used expressly for the purpose of changing the majority carrier type. That may be accomplished by other procedures, as is known to those skilled in the art. The present treatment has been found to be beneficial, though the exact effects are not fully understood. It is known that such treatment may crystallize an amorphous film, may increase or decrease conductivity, and may change carrier type.

Electrolyte 14 comprises an aqueous (or other polar solvent such as methyl or ethyl alcohol, for example) solution, which may be acidic or basic in nature. The preferred embodiment utilizes an electrolyte containing NaOH or KOH, for example, to provide a basic solution having pH greater than 7. Typically, the electrolyte layer may have a thickness in the range of 1-10 mm and contacts as much of each electrode as is practical. Other thicknesses are, of course, also possible. The electrolyte further contains ions from group VI (polychalcogenide ions) to stabilize the photoelectrodes against photodissolution. Sulfide ($S^=$) or selenium ($Se^=$) ions are presently used at a minimum concentration of 0.2 M.

Counterelectrode 15 is made of carbon impregnated with a metal selected from the group comprising Pt, Co, Ni, Fe, Pb, or Cu, or a mixture thereof. The electrode is ordinarily fabricated by soaking in a solution of the desired metal salt and by a subsequent heat treatment, as is known to those skilled in the art. Alternatively, the metal itself or a physical mixture of the metal powder, a filler (such as C powder), a binder (such as a Teflon suspension) pressed into a metal screen (a technique well known in fuel cell and battery technology), or a thin film of the desired metal is deposited on a suitable substrate.

Gasket 13, preferably an inert non-conducting material, is used to insulate electrodes 11 and 15 from each other. The gasket further provides the structure for containing a liquid electrolyte. Materials such as silicone rubber, Teflon, Glass, etc., are suitable for use as a gasket. As previously mentioned, the assembly is subsequently sealed. In the preferred method of fabrication, the assembly is edge sealed in such a manner that electrolyte leakage is prevented. Sealing may utilize a common, non-conducting epoxy adhesive 20, or instead use a silicone resin, or the like. Subsequent to the sealing, fill-holes 22 are utilized to fill the cell with electrolyte.

Or course, the amount of electrolyte used to fill the cell is chosen such that the volume expansion due to heating from incident insulation during operation does not lead to excessive internal pressure, i.e., the cell is made to be leak tight.

Leads 16 and 17 are attached to electrode layers 11 and 15 utilizing a conducting metal-filled epoxy, solder, or the like indicated at 21 in FIG. 1b. Inasmuch as contact is advantageously made to conductor 11, the characteristic or ohmic contacts which would have to be considered if semiconductor 12 were contacted, are of no concern.

To provide ease of fabrication of the contact between lead 16 and electrode 8, a tab is provided in the electrode structure as shown in FIG. 1b. Specifically, semiconductor photoelectrode layer 12 may be deposited on a section of NESA substrate 10 and 11, thereby leaving an exposed portion thereof, shown as tab 24 in the figure. Alternatively, the entire substrate may receive thin film semiconductor 12 thereover, and a portion of layer 12 subsequently may be etched away to expose conductor 11, thereby again forming pad 24.

In operation, the structure hereinabove described provides a negligible dark voltage difference between electrodes 11 and 15 e.g., less than 50 mV. Connection of leads 16 and 17 to a load reduces the voltage to effectively zero. Thus, the structure is not in itself a battery. No work is done thereby without irradiation. Upon irradiation, however, a photovoltage is generated (in the range of 0.3 to 0.8 volts) depending upon the radiation intensity and spectral distribution. The voltage is generated responsive to the interaction of the incident radiation with the semiconductor-electrolyte junction present at the interface of the semiconductor photoelectrode 12 and electrolyte 14. The Gerischer and Manassen et al references, supra, outline the origin of the photovoltage as is well known to those of ordinary skill in the art. The generated photovoltage provides terminal 11 with a negative polarity and 15 with a positive polarity, and provides for a flow of electrical current through a load connected therebetween. Specifically, electrons are driven in the external circuit from electrode 11 to electrode 15, and power is thereby delivered to the load.

The following examples of cell structures illustrate several features of the present invention in conformity with the cell shown in FIG. 1a.

EXAMPLE 1

A suitably cleaned piece such as $In_2O_3$-$SnO_2$ coated glass approximately 5 cm×5 cm×0.2 cm thick having a surface resistivity of approximately 20 ohms per square (obtained commercially) is placed above a CdSe+1% ZnSe (by weight) pressed powder target in a commercial sputtering unit. The CdSe-ZnSe mixture is sputtered at 400 watts forward power for 1 to 2 minutes using argon gas at 10 microns pressure. The substrate is masked so that a tab of uncoated $In_2O_3$-$SnO_2$ is available for contacting with a silver epoxied lead. The sputtered film and substrate are treated, post deposition, by heating at 375° C. for 15 minutes in air. A copper wire is then epoxied to the heat treated electrode, contacting only the $In_2O_3$-$SnO_2$ film. A silicone rubber gasket approximately 2 mm thick is placed around the edge of the electrode. A carbon piece approximately 5 cm×5 cm×0.2 cm, impregnated with a metal salt solution of $CoCl_2$ and thiourea and then fired at 300° C. in air for 10 minutes, is placed over the gasket. It is believed that the decomposition product is a sulfide of cobalt which acts as an electrocatalyst. The carbon electrode is provided with two small holes drilled therethrough to allow filling of the cell with electrolyte. A copper wire is then epoxied to the carbon electrode and the cell is sealed on its sides and back with a silicone adhesive (with the exception of the fill-holes). After the resin has cured, the cell is filled with a hypodermic needle with an aqueous solution which is 1 M in NaOH, 3 M in $Na_2S$ and 3 M in S. The fill-holes are plugged and the cell is ready for use. The I-V characteristics of a typical cell prepared in this manner are shown in FIG. 2.

Figure 2A:
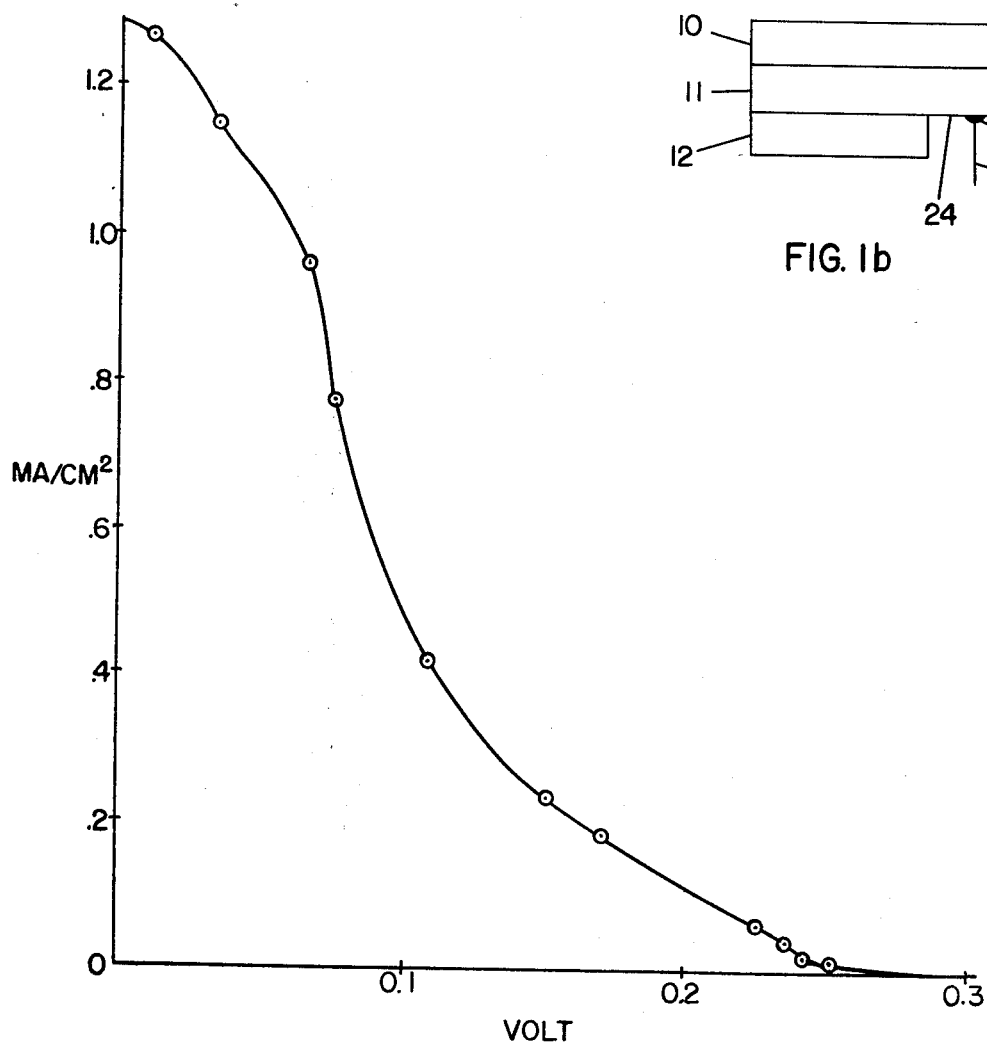
FIGS. 2a and 2b provide current voltage characteristics for a cell.

FIG. 2a shows the current voltage curve of a completed cell as described above under a light intensity of 20 mw/cm² from a Xe arc.

Figure 2B:
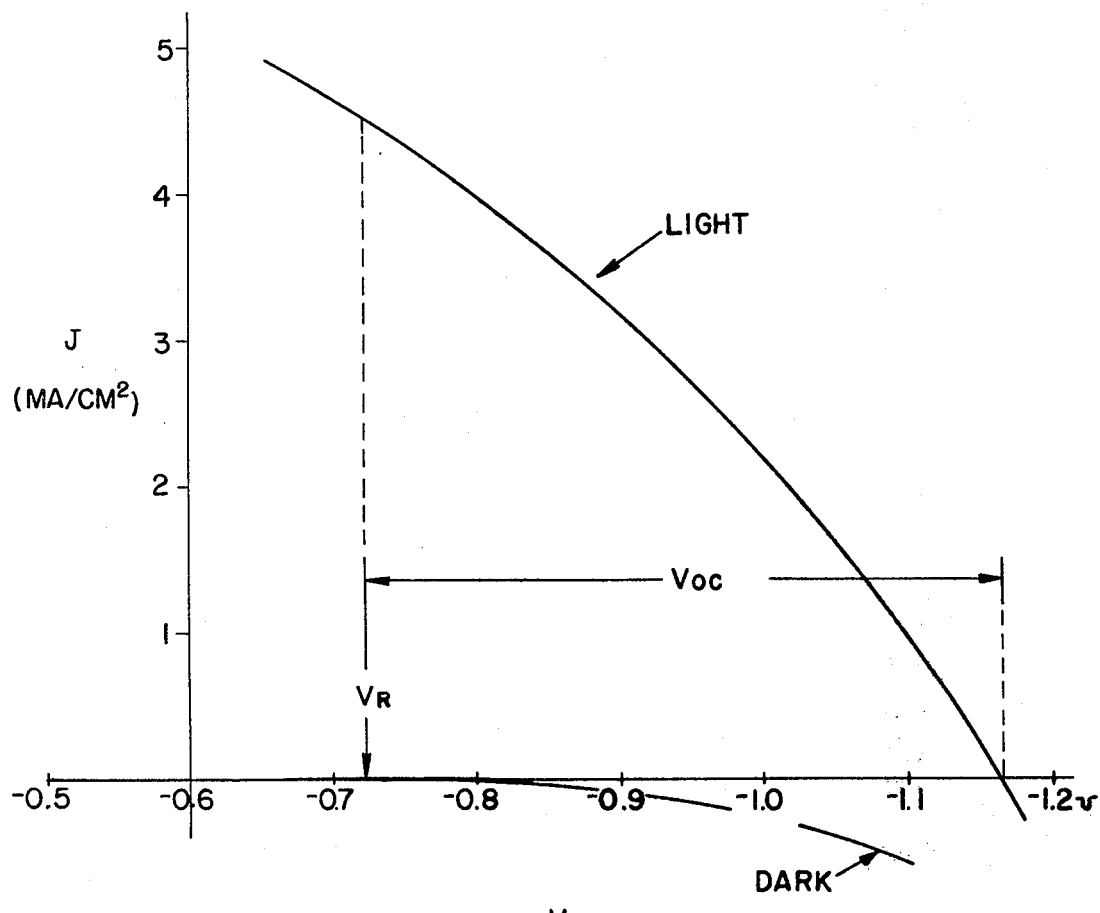

FIG. 2b shows a potentiostatic current-voltage curve of a a CdSe photoelectrode prepared as above measured against a standard saturated calomel reference electrode (SCE). The current density is plotted against the potential of the electrode relative to SCE. The rest potential ($V_r$) is at $-0.72$ v vs. SCE. The current density at this potential is 4.5 mA/cm² which is the shorting current. The potential at zero current is $-1.16$ v vs. SCE. The open circuit voltage ($V_{oc}$) is therefore 0.44 v. The light intensity was 20 mw/cm². The corresponding curve in the dark is also shown.

EXAMPLE 2

The structure is like that of Example 1, but utilizing pure CdSe for the semiconductor rather than CdSe+1% ZnSe, as disclosed in Example 1. The observations were that the pure CdSe provides an increased dark current, and that the open circuit voltage $V_{oc}$ decreased from 0.44 to 0.3 volt (see the potentiostatic curve, FIG. 2b).

EXAMPLE 3

The structure is essentially that of Example 1, but without the post deposition treatment of the doped semiconductor film of CdSe+1% ZnSe. Without firing the film in air after the sputtering deposition, the potentiostatic $I_{sc}$ (shorting current) decreased from 4.5 mA/cm² to approximately 0.4 mA/cm² under similar conditions.

EXAMPLE 4

The structure is essentially as disclosed for Example 1, but in which the CdSe+1% ZnSe was sputtered at a 300 watt power level. The $I_{sc}$ decreased from 4.5 mA/cm² to approximately 2 mA/cm² under similar conditions.

EXAMPLE 5

Essentially the same structure as in Example 1, but in which the electrolyte used was 1 M in NaOH, 1 M in Na$_2$S and 1 M in S. The I-V characteristics under illumination are similar to that of Example 1 at low light intensities (lower than 20 mW/cm$^2$), but performance drops off at higher light intensities.

Figure 3:
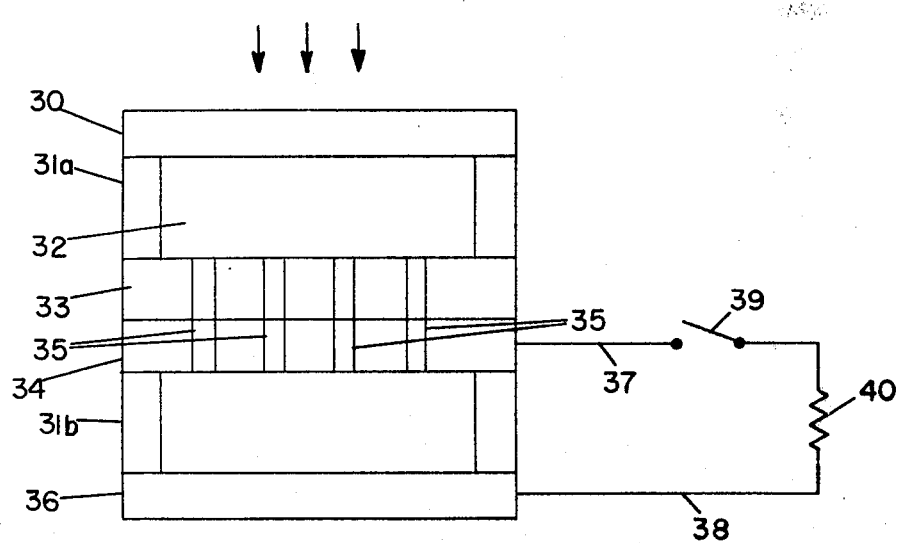
FIG. 3 shows a plural chamber embodiment of the present invention.

Referring now to FIG. 3, an alternate embodiment of the invention is shown, wherein the structure differs but operation is essentially the same. Specifically, a plain transparent window 30 is provided, supported by inert gasket material 31a which also functions to contain electrolyte 32 between window 30 and semiconductor photoelectrode 33. In view of the electrolyte receiving the incident radiation before the semiconductor photoelectrode, it follows that photoelectrode 33 need not be transparent in this embodiment, as was required in the embodiment of FIG. 1. That is, the photoactive site in the present embodiment is at the upper junction of photoelectrode 33 and electrolyte 32.

Semiconductor material 33 further need not necessarily be a thin film, inasmuch as the requirement for transparency has been removed. Semiconductor 33 is deposited on a conducting substrate 34 (such as Ti, Pt, Au, C, etc.) by sputtering, CVD, vacuum evaporation of the compound and/or the constituent elements, or electrodeposition for example. The latter technique of electrodeposition is not available for the first embodiment inasmuch as destruction of the transparent conductor would result. It is possible, however, that a transparent conductor may ultimately be discovered capable of withstanding the cathodic bias involved in the operation so that this technique may be used for the embodiment of FIG. 1 as well. The substrate may, but need not, be a metal.

Photoelectrode 33 and substrate 34 include registered holes therein, permitting the electrolyte to communicate between the chambers above and below the photoelectrode. As discussed supra, the fact that the electrolyte is exposed to radiation in the upper chamber permits a departure from the thin film, transparency requirement of the photoelectrode in the first embodiment. Similarly, substrate 34 need not be transparent.

The cell includes a second, lower chamber, between the photoelectrode and the substrate therefor and the counterelectrode 36. Holes 35 permit the electrolyte to communicate between the two chambers. Gasket 31b provides for separation between the substrate 34 and counterelectrode 36, as well as forming a portion of the chamber for containing the electrolyte between the substrate and the counterelectrode.

Holes 35 are used in the present embodiment to permit the oxidized ions to travel to the counterelectrode for reduction. Of course, an alternative embodiment could be provided permitting a passageway external to the cell, rather than within the cell as shown herein. It is essential for the purposes of the present embodiment, however, that the electrolyte contacting the semiconductor photoelectrode be in contact with the electrolyte contacting the counterelectrode.

Wires 37 and 38 are shown connected to the photoelectrode (specifically, by way of illustration, to the metal substrate thereof) and to the counterelectrode. Wires 37 and 38 communicate the power generated within the cell by way of switch 39 to electrical load 40.

EXAMPLE 6

The photoelectrode is fabricated as follows: a piece of titanium sheet approximately 0.04 cm thick and having the dimensions of 2 cm $\times$ 5 cm, with several small holes drilled therein, is held above a CdSe pressed powder target in a commercial sputtering unit. The CdSe is sputtered at 400 watts forward power for five minutes. The CdSe/Ti electrode is then heat treated for 15 minutes at 425° C. in air. Referring to FIG. 3, a copper wire is attached to the Ti and the cell is assembled as follows: silicone rubber gasket 31a is placed on glass cover 30. The CdSe/Ti electrode fabricated as above is placed on the gasket, and gasket 31b placed over the combination. The carbon electrode, impregnated with cobalt sulfide as in Example 1, is placed thereover, and the cell sealed. The aqueous electrolyte is the injected into the cell, and the fill-holes sealed. The following potentiostatic performance parameters are typical of such a photoelectrode:

$V_{oc}$ (open circuit voltage) 0.35 V
$I_{sc}$ (shorting current) $\approx$ 3 mA/cm$^2$
$P_{max}$ (maximum power output) 0.3 mW/cm$^2$ (at a light intensity of 20 mW/cm$^2$)
$\eta$ (solar to electrical power conversion efficiency) 1.5%.
F.F. (fill factor) 35%

EXAMPLE 7

The structure is similar to that of Example 6 but rather than sputtering, the CdSe was electro-deposited from an aqueus solution of 1 gm CdSO$_4$, 0.2 gm SeO$_2$ in 100 ml 1 NH$_2$SO$_4$. The properly cleaned Ti is made the cathode during electrodeposition, and several microns of CdSe are electrodeposited at a current density of 60 mA/cm$^2$ for 150 seconds. The film is rinsed in deionized water and heat treated in air at 425° C. for five minutes. Under potentiostatic conditions with an electrolyte 1 M in NaOH, 1 M in Na$_2$S, 1 M in S electrolyte and 20 mW/cm$^2$ irradiation from a Xe arc, the open circuit voltage is 0.4 volt and the short circuit current is 3 mA/cm$^2$.

EXAMPLE 8

The structure is essentially similar to that of Example 7 but with a different post deposition treatment: the CdSe film is buried in powdered CdSe, fired in a N$_2$ atmosphere at 700° C. for 10 minutes and subsequently in air at 425° C. for 10 minutes. The open circuit voltage was 0.6 volt rather than 0.4 volt due to a substantial decrease in dark current. Of course, where the substrate is glass the treatment at 700° C. cannot be done, inasmuch as the glass would melt.

EXAMPLE 9

The structure is essentially similar to Example 8, but in which the film, after firing, is etched in a 50% HCl+H$_2$O solution for five seconds. A film which gave 1 milliamp per square centimeter shorting current before etching gave a current of 3 milliamps per square centimeter after etching and the fill factor improved.

Figure 4A:
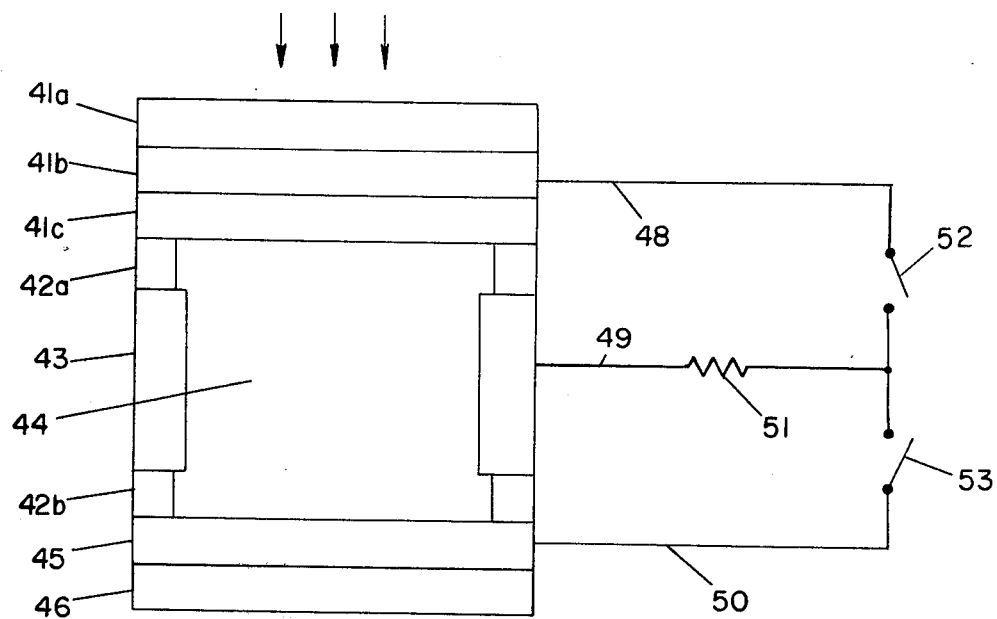
FIGS. 4a and 4b illustrate a multi-photoelectrode embodiment.

FIG. 4a provides yet a third embodiment of the present invention and illustrates a situation wherein three electrodes are provided in a single cell. The cell includes a composite electrode 41, comprising a transparent substrate 41a, along with a transparent conductor 41b and a first semiconductor film 41c. The semiconductor utilized in the present embodiment is CdS, a film passing radiation of wavelength in excess of 5,500 Å. A chamber is formed having gasket segments 42a and 42b for separating counterelectrode 43 from the first semiconductor film 41c and from a second photoelectrode comprising a second semiconductor film 45. The second semiconductor film comprises, for example, CdSe, material responsive to radiation of wavelengths less than 7,200 Å. Contained within the chamber formed between electrode 41c, gasket 42a, counterelectrode 43, gasket 42b and electrode 45 is an electrolyte 44. The semiconductor film 45 is deposited on a conducting substrate 46.

Electrolyte 44 is chosen to pass radiation having wavelengths within the range of wavelengths passed by the first semiconductor and those effective on the second semiconductor. Particularly, where the first semiconductor is cadmium sulfide, having an orange appearance and passing radiation with wavelengths exceeding 5,500 Å, an orange electrolyte, a polysulfide electrolyte, is chosen. Thus, the photoactive site formed at the interface between the electrolyte and the first semiconductor electrode is responsive to radiation of wavelengths shorter than 5,500 Å. Any radiation of wavelength greater than 5,500 Å is passed by the CdS and through the electrolyte to the second semiconductor film. At the interface between the electrolyte and the second semiconductor film, where the interface is responsive to wavelengths shorter than 7,200 Å, all radiation passed by the first photoactive site is incident on the second photoactive site.

The second semiconductor film provides a second electrical output of the cell, in addition to the first output taken from the transparent conductor as in FIG. 1. Leads 48, 49 and 50 are connected to the transparent conductor, the counterelectrode 43 and the second semiconductor 45. Switching means 52 and 53 are provided to enable connection of the electrical power on leads 48 and 50 to load 51 in any combination. Thus, either one or both of switches 52 and 53 may be closed to provide power to load 51.

As discussed in connection with FIG. 3, second semiconductor film 45 need not be transparent, inasmuch as any radiation has already passed through the electrolyte and the photoactive junction thereof prior to impinging on the film itself.

From the preceding discussion, it is concluded that the semiconductor film having a smaller bandgap (i.e., responsive to radiations of longer wavelengths) must be in the back of the cell. Otherwise, if such a film were provided at the first photoactive site, then only radiation of insufficient energy to excite the smaller bandgap (of wavelengths greater than 7,200 Å in this example) would be passed thereby. This low energy radiation would then impinge on the photoactive site at the semiconductor having even a larger bandgap energy, and accordingly not cause any reaction thereat.

The presently provided switching arrangement permits the two photoelectrodes to be employed separately or to be tied together inasmuch as both are photo-anodes.

An alternative example to the present structure utilizes CdSe as the front electrode and CdTe, a smaller bandgap material at the back, along with a polyselenide electrolyte. As previously mentioned, the electrolyte is chosen to have a similar cut-off to the first electrode.

Figure 5:
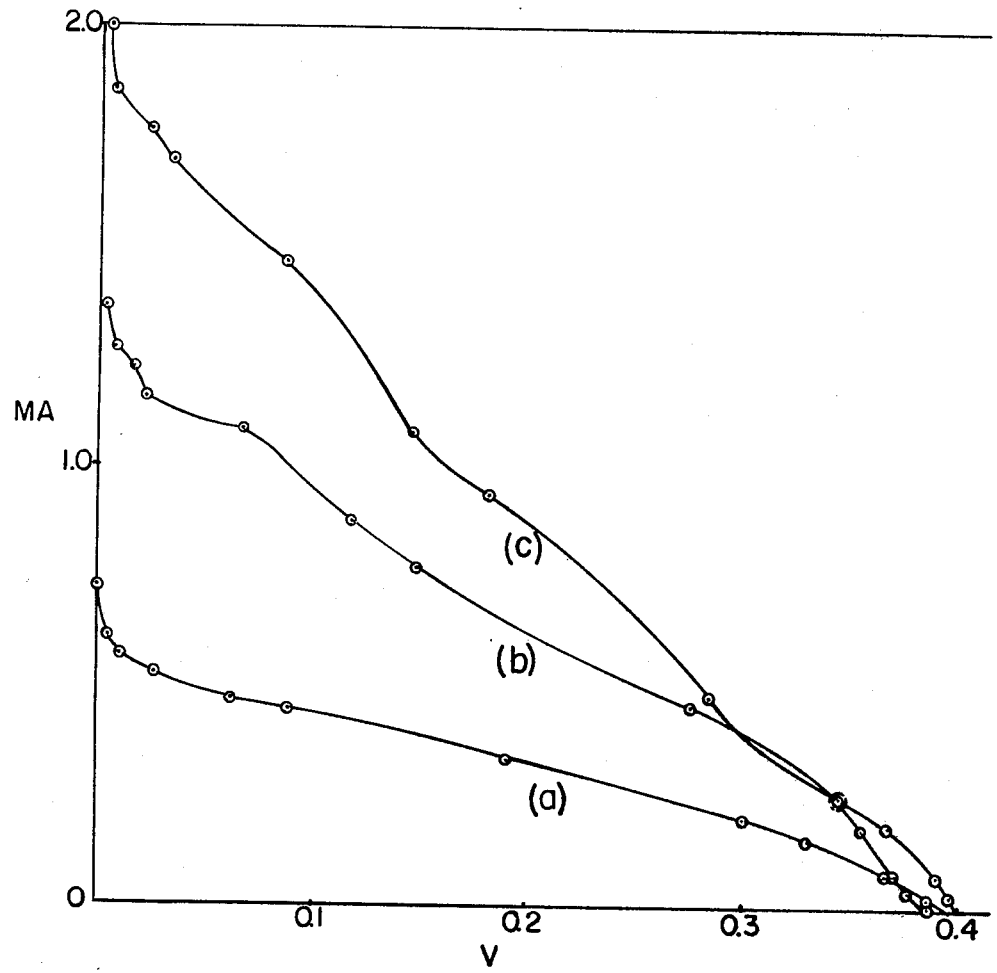

FIG. 5 shows the I-V curves for a cell of the type of FIG. 4a hereinabove described utilizing a sputter deposited CdS film on a conducting Indium oxide coated glass substrate as a front photo-anode, and a sputter deposited CdSe film on a titanium substrate as the second photo-anode. The electrolyte utilized was 1 M in NaOH, 1 M in $Na_2S$, 1 M in S in water. An annular ring of carbon was used as a counterelectrode, and silicone rubber was the gasket. The cell was irradiated by a Xe arc at an intensity of 20 mw/$cm^2$. Curve 5a shows the I-V curve for the CdS photo-anode, and curve 5b shows the I-V curve for the CdSe photo-anode. Curve 5c shows the I-V curve when the two photo-anodes are connected in parallel illustrating the advantageous result obtained with this example.

Figure 4B:
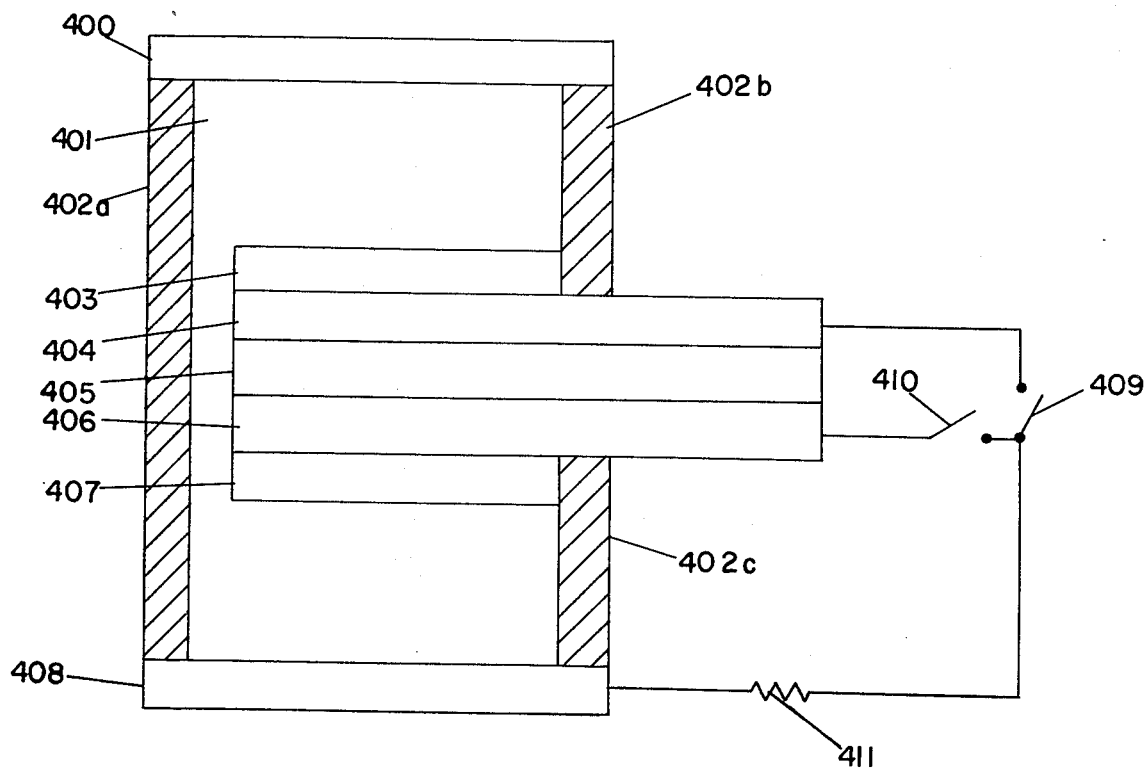

FIG. 4b shows another embodiment where the two semiconductor layers are deposited on opposing sides of a single substrate. The substrate is transparent and is coated on both sides with a transparent conductor. The counterelectrode may readily be made as large as the photo-anodes, which is known to be beneficial. Although the radiation has to traverse an electrolyte layer before reaching the first photoelectrode (403), it now has to pass only through the transparent conductors (404 and 406) and the transparent substrate (405) before reaching the second photo-anode (407).

Figure 6:
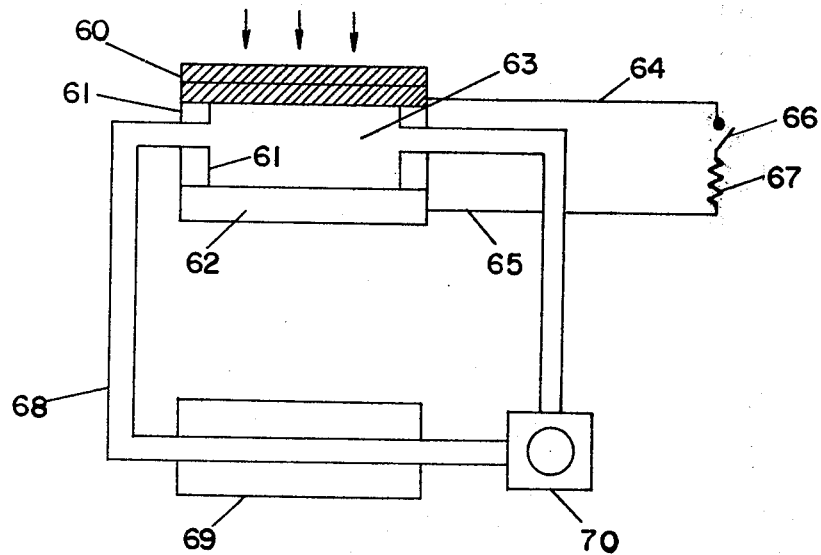
FIG. 6 illustrates the utilization of the present cell in a heat exchange environment.

Yet another embodiment of the present invention is illustrated in FIG. 6, wherein the photoelectrode chemical cell is shown as simultaneously performing the two functions of electrical power generation and solar heat absorption. Thus, the illustrated structure comprises a composite electrode 60, having the transparent substrate, conductor and semiconductor photoelectrode combination discussed in connection with the previous embodiments. A gasket seal 61 is shown between the electrode 60 and counterelectrode 62. Electrolyte 63 is contained within the chamber formed by the electrode, the counterelectrode and the gasket, and leads 64 and 65 provide the electrical energy from the electrodes, via switch 66, to load 67, as previously described.

In addition to the electrical generation of the cell, a second function is performed by the present structure. Specifically, electrolyte 63 experiences an increase in temperature as a result of heat exchange with the other structural components of the cell and due to absorption of long wavelength infrared radiation. The electrolyte is circulated by means of piping 68 to heat exchanger 69 by way of pump 70.

Thus, the electrolyte is effectively used as a primary heat exchange fluid circulated by the pump 70. As a result of the present structure, the system is capable of converting solar energy into useful energy capable of doing work by two mechanisms. Firstly, electrical energy is directly generated by the photoelectrochemical processes previously described. Secondly, heat energy is generated for hot water or space heating applications, for example. Of course, the use of the cell for heating applications is not limited to the structure shown in FIG. 6, but may similarly be provided for the previously described embodiments.

Referring now to FIG. 7, three cell structures are disclosed which incorporate therein a storage electrode.

Prior to description of the structure utilized, the following is provided by way of explanation. In normal operation of a photoelectrochemical cell of the type described, a first electrode, the counterelectrode, is utilized having essentially constant potential, determined by the redox couple in the electrolyte, regardless of the state of its irradiation. That is, the electrode may be in the dark or in the light, and maintain the same potential. "Potential" as utilized herein is essentially with respect to a reference electrode, such as a saturated calomel electrode (SCE) for example.

A second electrode, the photoelectrode, is utilized having a potential variation with respect to SCE responsive to irradiation. Thus, a CdSe electrode may show a potential of −0.7 V with respect to SCE in the dark, and may have a potential of −1.1 V with respect to SCE in the light. A carbon electrode possesses a potential of −0.7 V with respect to SCE both in dark and light conditions. If a third electrode is provided which can undergo a reversible redox reaction, is compatible with the electrolyte and has a redox potential greater in magnitude than the potential of the counter-electrode, but less in magnitude than the potential of the irradiated photoelectrode, then a photoelectrochemical cell of the type described can be converted into a storage cell.

A structure embodying a storage electrode is disclosed in co-pending application Ser. No. 763,071, "Triple Electrode Photogalvanic Cell with Energy Storage Capability," assigned to the assignees hereof and incorporated herein by reference. A publication by Manassen et al in the *Journal of the Electrochemical Society*, Vol. 124, pp. 532-4, 1977, elaborates also on photoelectrochemical energy conversion and storage cells. The present embodiment of the instant invention incorporates a structure similar to that described in Ser. No. 763,071 with the addition of a semipermeable membrane and utilizing for illustrative purposes a photo-anode of cadmium selenide, a carbon counterelectrode and a storage electrode comprised either of $Ag/Ag_2S$ or $Cd/Cd(OH)_2$. The $Ag/Ag_2S$ electrode has a redox potential of −0.9 volt vs. SCE in basic solution, while the $Cd/Cd(OH)_2$ electrode has a redox potential of −1.0 volt vs. SCE. It is apparent that an irradiated cadmium selenide electrode at a potential of −1.1 volts vs. SCE will be able to charge both of these electrodes, 0.2 volt is available to charge the $Ag/Ag_2S$ electrode and 0.1 volt is available to charge the $Cd/Cd(OH)_2$ electrode.

To stabilize the cadmium selenide electrode sulfur must be added to the sodium sulfide electrolyte giving a polysulfide solution. The silver electrode, however, corrodes in polysulfide solution forming silver sulfide. This effectively discharges the storage electrode. Therefore, the $Ag/Ag_2S$ electrode must be separated from the polysulfide electrolyte by an ion permeable membrane which allows no polysulfide ions or sulfur to migrate into the sulfide electrolyte used for the $Ag/Ag_2S$ electrode. Similarly, the $Cd/Cd(OH)_2$ electrode corrodes even in ordinary sulfide electrolyte forming cadmium sulfide. This storage electrode must be used in a potassium hydroxide or sodium hydroxide electrolyte separated by a permeable selective membrane that stops sulfide diffusion. For the two examples above in the charged state one obtains a battery with a voltage of 0.2 volt with a $Ag/Ag_2S$ hyphen carbon combination and the battery with a voltage of 0.3 volt with a $Cd/Cd(OH)_2$ hypen carbon combination.

Other examples of storage electrodes with suitable redox potentials may be found in the book by W. M. Latimer, *The Oxidation States of the Elements and Their Potentials in Aqueous Solutions*, published by Prentice-Hall, Incorporated.

An example of a membrane used successfully with the above two examples of storage electrodes is one manufactured by the Dupont Company and known as NAFION.

Figure 7A:
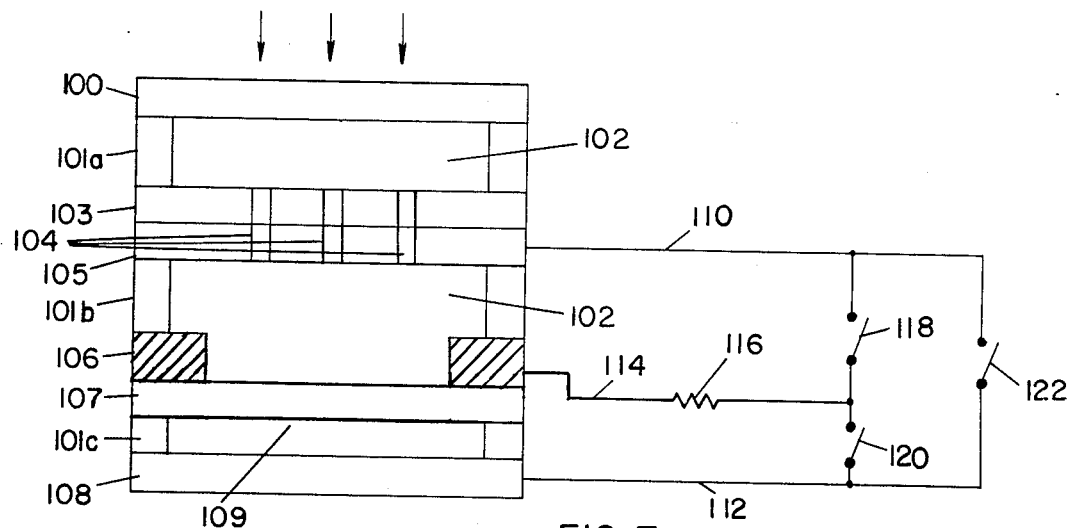
FIGS. 7a, 7b and 7c illustrate the combination of several embodiments incorporating therein a storage electrode.

Referring specifically to FIG. 7a, a multi-chamber structure is shown incorporating a transparent cover 100, such as glass for example, and a gasket 101a forming portions of a chamber for electrolyte 102. A photoelectrode comprising a semiconductor film 103 on a conducting substrate 105 forms the remainder of the chamber, with holes 104 provided through the semiconductor film and conducting substrate to provide communication of the electrolyte between the two chambers on either side of the electrode. Gasket 101b is shown forming the second chamber with electrode 103-105, and in conjunction with a semi-permeable membrane 106. The electrolyte contained in both chambers is the same, and the previous description of operation of FIG. 3 is applicable hereto. Semi-permeable membrane 106 is provided to separate the electrolyte utilized in conjunction with the photoelectrode from the electrolyte used in conjunction with the storage electrode. The membrane is selected to permit selective ionic passage for the current generation or charge storage desired of the present embodiment.

Counterelectrode 107 is placed above the semi-permeable membrane. The third chamber of the device is formed by membrane 106, gasket 101c and storage electrode 108. The chamber stores electrolyte 109, which usually differs from electrolyte 102. The electrolyte 109 is selected such that the storage electrode will not corrode, or self discharge. However, known examples of such electrolytes will not stabilize the photoelectrode. Those which stabilize the photoelectrode, corrode the storage electrodes. Accordingly, membrane 106 is utilized in the present embodiment to permit both stabilization of the photoelectrode and non-corrosive use of the storage electrode.

It is to be noted that while counterelectrode 107 is shown as being above the storage chamber of the cell, it may similarly be on both sides of the membrane concurrently.

Leads 110, 112, and 114 are shown connected to the conducting substrate of the photoelectrode, the storage electrode and the counterelectrode, respectively, to conduct electrical energy therefrom to load 116 by way of switches 118 and 120. In operation, closure of switch 118 permits delivery of power to lead 116 under normal photoactivity. Similarly, closure of switch 120 permits delivery of power to the load from the storage function of the cell, while closure of both switches simultaneously may be used to provide power from both cell functions to the load.

As described in the above-identified co-pending application, Ser. No. 763,071, a jumper 122 may be provided to facilitate the storage function in the present cell.

Figure 7B:
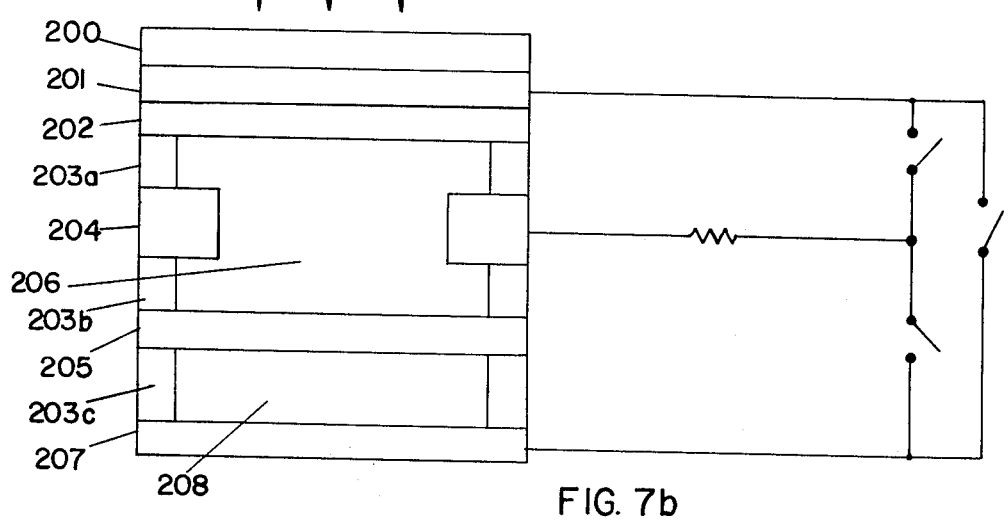

Referring now to FIG. 7b, the embodiment shown essentially uses the structure of the embodiment of FIG. 1 in conjunction with the storage electrode assembly described along with FIG. 7a. Specifically, a transparent substrate 200 is used in conjunction with a transparent conductor 201 and a semiconductor film 202. A gasket 203a and 203b is utilized as to form the electrolyte chamber, and counterelectrode 204 is shown as being within that chamber. Semi-permeable membrane 205 is provided to complete the chamber, and electrolyte 206 is stored therein.

A second chamber is formed by membrane 205, gasket 203c, and storage electrode 207. A properly selected electrolyte 208 is contained within the chamber and performs the storage function in the manner previously described. Additionally, the load and switching arrangement shown in FIG. 7a is repeated herein. It is to be understood, of course, that any switching means is contemplated, and the power is to be delivered to any load and not just to a resistive load.

Figure 7C:
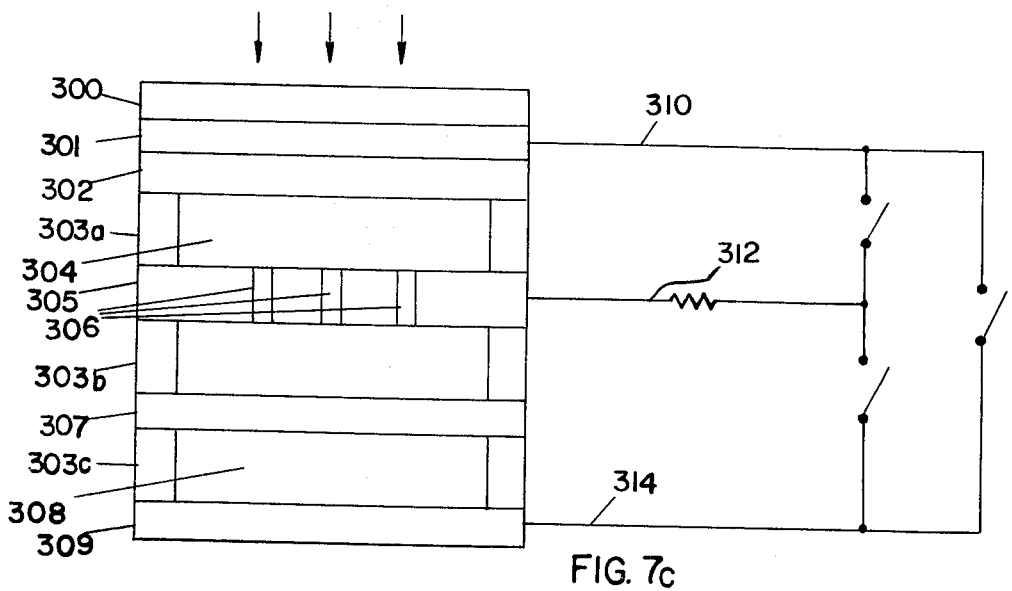

FIG. 7c provides yet a further modification of the storage electrode structure, utilizing a transparent substrate 300, a transparent conductor 301 and a photoelectrode composed of the semiconductor film 302 as in FIG. 1. Gasket 303a is used to form a first chamber containing electrolyte 304 therein, and counterelectrode 305 is shown as having holes 306 therein. A second chamber, in communication with the first chamber through holes 306, is formed by counterelectrode 305, gasket 303b, and semi-permeable membrane 307. Finally, a chamber is formed for the electrolyte used in conjunction with the storage electrode, the chamber being formed by membrane 307, gasket 303c, and storage electrode 309 for containing electrolyte 308. A typical switching arrangement and load, similar to that described in conjunction with FIG. 7a is shown, with the wires 310, 312 and 314 being connected to the photoelectrode conductor, the counterelectrode, and the storage electrode, respectively.

The storage feature described may be combined with other aspects of the present invention, including but not limited to the structure of FIGS. 4a and 4b, for example.

Clearly, the structures disclosed hereinabove may be cylindrical, or may have other shapes. Any materials disclosed are for illustrative purposes only, and do not limit the invention.

The preceding specification describes, by way of illustration and not of limitation, a preferred embodiment of the invention. Equivalent variations of the described embodiment will occur to those skilled in the art. Such variations, modifications, and equivalents are within the scope of the invention as recited with greater particularity in the following claims, when interpreted to obtain the benefits of all equivalents to which the invention is fairly entitled.

We claim:

1. A method of fabrication of a photoelectrochemical cell comprising the steps of:
    (a) depositing a semiconductor thin film containing a material other than zinc selenide on a conductive substrate transmissive to electromagnetic irradiation, thereby forming a first electrode,
    (b) performing a post deposition treatment of the coated substrate,
    (c) placing an inert gasket material around the perimeter of said electrode,
    (d) placing a stable counterelectrode on said gasket,
    (e) sealing the cell with a non-conductive sealant, and
    (f) filling the cell with an electrolyte;
        wherein said depositing step comprises one or more of the group of steps of sputtering, chemical vapor deposition, vacuum evaporation, and electrodisposition; and further
        wherein said depositing step comprises the step of doping said semiconductor with zinc selenide.

2. A method of fabrication of a photoelectrochemical cell comprising the steps of:
    (a) depositing a semiconductor thin film containing a material other than zinc selenide on a conductive substrate transmissive to electromagnetic irradiation and doping said semiconductor with zinc selenide, thereby forming a first electrode,
    (b) performing a post deposition treatment of the coated substrate,
    (c) placing an inert gasket material around the perimeter of said electrode,
    (d) placing a stable counterelectrode on said gasket,
    (e) sealing the cell with a non-conductive sealant, and
    (f) filling the cell with an electrolyte.

3. The method of claim 2 wherein said post deposition treatment comprises the step of etching.

4. The method of claim 2 wherein said post deposition treatment comprises the step of heating.

* * * * *